United States Patent [19]

McDonald

[11] 3,774,590

[45] Nov. 27, 1973

[54] UTERINE SPECIMEN COLLECTING METHOD

[76] Inventor: Bernard McDonald, 18212 Pacific Coast Hwy., Malibu, Calif. 90265

[22] Filed: June 22, 1971

[21] Appl. No.: 155,513

Related U.S. Application Data

[63] Continuation-in-part of Ser. No. 24,535, April 1, 1970, Pat. No. 3,633,565.

[52] U.S. Cl. .............................................. 128/2 B
[51] Int. Cl. ............................................. A61b 19/00
[58] Field of Search .................. 128/2 B, 2 F, 2 R, 128/2 W

[56] References Cited
UNITED STATES PATENTS 2,905,169  9/1959  Nieburgs ........................... 128/2 B
3,352,299  11/1967  Sagirogh ............................. 128/2 B
3,394,699  7/1968  Koett .................................. 128/2 B Primary Examiner—William E. Kamm
Attorney—Edward H. Loveman

[57] ABSTRACT

A specimen collecting method comprises an elongate clinical instrument comprises a blade and handle for collecting cells and tissues from body cavities, particularly for the detection of squamous carcinoma of the cervix. Two slanted spaced-apart edges on the blade tip describe a conical path during manual rotation in situ and gather specimens in troughs adjoining the edges. The blade tip is manually separable from the handle for forwarding to a pathology laboratory.

2 Claims, 6 Drawing Figures

Patented Nov. 27, 1973

3,774,590

INVENTOR.
BERNARD McDONALD
BY
Edward H Loveman
ATTORNEY

UTERINE SPECIMEN COLLECTING METHOD

This is a continuation-in-part of my patent application Ser. No. 24,535 filed Apr. 1, 1970, now U.S. Pat. No. 3,633,565 issued on Jan. 11, 1972.

This invention concerns a clinical specimen collecting method and more specifically relates to a method of collecting tissue fragments from the human uterus.

Devices commonly used for collection of samples as required for detection of interuterine cancer or the like typically include simple swabs, small wood stocks, brushes or else relatively elaborate and costly aspirators. Since cancer cells are fragile and break or fall away easily from any surface supporting them, and since surrounding tissues usually obscure the test area, it is often difficult to know whether such cells which might have been initially resting on a swab of stick were jarred or rubbed off and lost in the attempt to remove the same from the test situs.

The problem associated with specimen collecting in the foregoing context are notably difficult in the case of squamous carcinoma which most commonly originates at the squamo columnar junction. An accurate determination of cancer requires a complete survey of the entire test area, which would involve multiple biopsies, and even those would represent localized portions rather than a comprehensive sampling of the total area. Ideally, fragments of tissue must be recovered representing the total test situs to permit preparation of histological slides which retain tissue architecture as opposed to cytology slides which present a collection of isolated cells. Surfaces which merely contact a tissue in a manner of a swab or stick collect only loose particles and not tissue fragments. Moreover, many doctors lack the time and patience to transfer every collected cell and particle from a stick onto a microscopic slide, whereby valuable diagnostic material may be lost, resulting in a risk or erroneous conclusion in respect to the patient's condition.

Due to the foregoing limitations, many Pap Smears cannot be accurately diagnosed or else render only an ambiguous result. Where this is the case, a surgical procedure called "cold conization" is typically resorted to. However, this is a relatively major operation requiring hospitalization and general anesthesia. The invention device disclosed herein is designated to bridge this diagnostic gap between the office "Pap Smear" and the hospital "cold cone" thereby preserving many women from the risk of non-detection on one hand or the discomfort, danger and expense inherent in a major operation.

The specimen collecting method in this case consists of first inserting an elongate tool or implement into the cervical canal, said tool comprising a handle portion and a blade portion. Blade portion is essentially flat or planar and has a pair of oppositely facing and spaced-apart edges adapted to scrape the entire circumference of the squamo columnar junction area with a deep ploughing action. A storing groove or trough adjoins each of the edges and receives the samplings progressively obtained by the stated edges during rotation of the instrument. Rotation is accomplished by force manually applied to the handle portion. Following removal of the implement from the cervical canal, force is manually applied to portions of the implement as required to break the implement at the location of thinned neck portion therebetween, after which the blade with the collected matter in the grooves may be dropped into a biopsy bottle and sent to a laboratory for pathological analysis.

Many of the attendant advantages of this invention will be readily appreciated as the same becomes better understood by reference to the following detailed description when considered in connection with the accompanying drawings in which.

Figure 1:
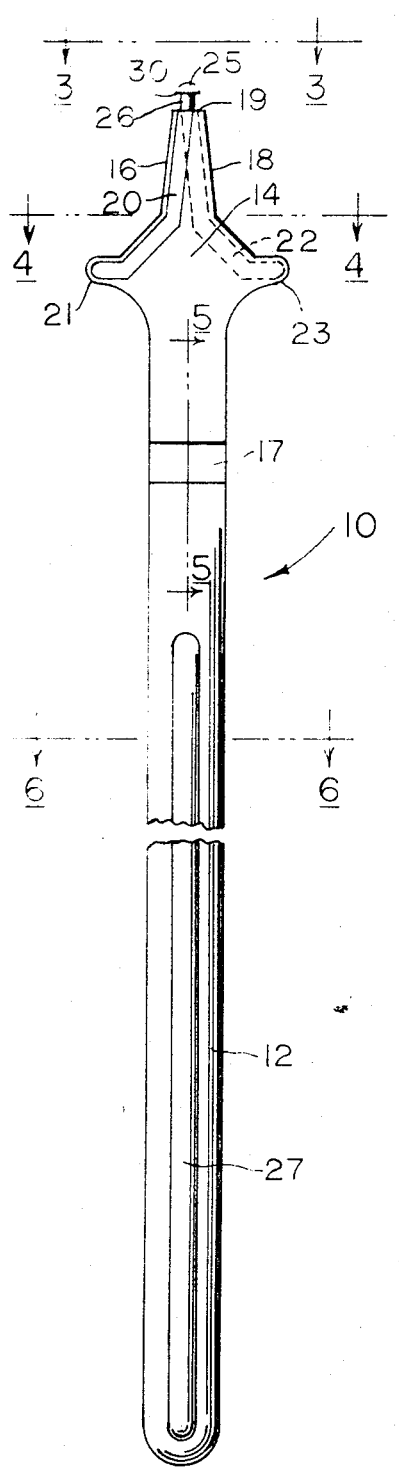
FIG. 1 shows a partly fragmented elevational view of the structure disclosed herein.
Figure 2:
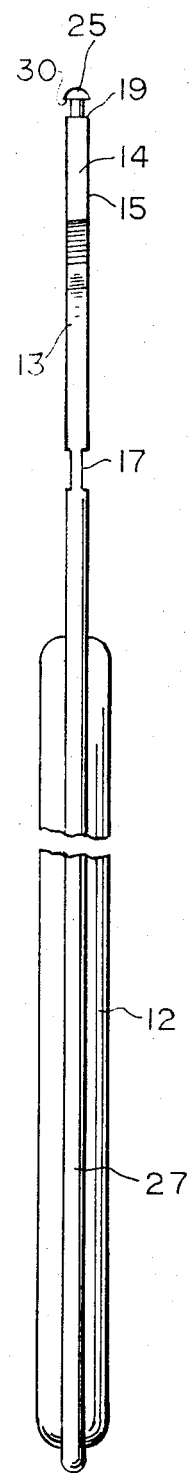
FIG. 2 shows a view corresponding to FIG. 1 but with the structure rotated ninety degrees relative thereto.
Figure 3:
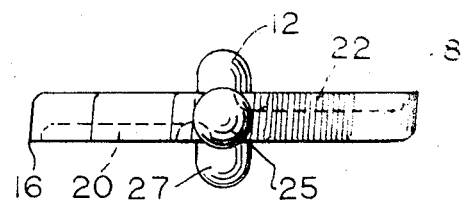
FIG. 3 shows a tip view looking downward onto the structure shown in FIGS. 1 and 2.
Figure 4:
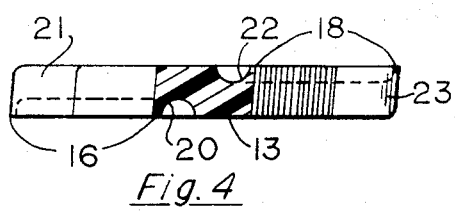
FIG. 4 shows a cross-sectional view taken along line 4—4 of FIG. 1.
Figure 5:
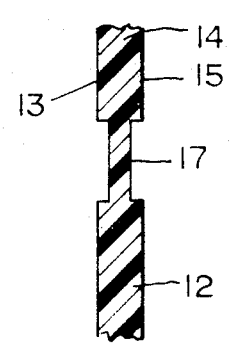
FIG. 5 shows a cross-sectional view taken along line 5—5 of FIG. 1.

Referring now to the drawings wherein like reference characters designate like or corresponding parts throughout, there is illustrated in FIG. 1 an implement, generally designated as reference numeral 10 comprises a handle portion 12 and a flat blade portion 14 integrally formed therewith of a substantially rigid material such as plastic. The blade portion 14 has oppositely faceing substantially parallel surfaces 13 and 15 (more particularly illustrated in FIG. 2) and a structurally weakened neck portion 17 defined by a traverse groove across both surfaces 13 and 15 which result in a reduced cross-sectional thickness as clearly shown in FIG. 5. The blade portion 14 is an elongate cutter shaped along the sides thereof to correspond generally with the natural contours of the cervix of a human uterus as required for maximum effectiveness in performing its intended function. Thus, the opposite side contours defined by a pair of thin lips or cutting edges 16 and 18 may be seen to diverge from relatively close proximity therebetween near a distal end 19 to a maximum width of a pair of oppositely directed projections 21 and 23. The edges 16 and 18 thus describe a conical path when the implement 10 is rotated by normal force applied to the handle 12. If only one edge were made to function as a specimen collector, the lateral forces on such blade would be unbalanced during rotation of implement 10 and its longitudinal axis in the manner described below, whereby two oppositely directed edges are preferred in the symmetrical relationship suggested by edges 16 and 18. A separate recessed groove adjoins each of the edges 16 and 18 as suggested by grooves 20, 22 respectively, and extends coterminally therewith so as to describe the same conical path as edges 16 and 18 during rotation of implement 10 as discussed above. The number of edges 16, 18 of adjoining grooves 20, 22 could be more than two in number, but as a practical matter only two of each, as suggested by the structure shown in the accompanying drawing, have been found to provide all the advantages sought in this case. Also, while the angularity of the edges 16, 18 and adjoining grooves 20, 22 could be varied slightly, the preferred arrangement is for the included angle to be from about 10 to 30 degrees between the edges in that portion between distal end 19 and line 4—4 in FIG. 1, for example, increasing to about 45° to 60° included angle in the flared portion from line 4-4 to oppositely extending projections 21 and 23. Of particular importance is the fact that edges 16, 18 are directed in opposite directions as seen in FIGS. 3 and 4.

Figure 6:
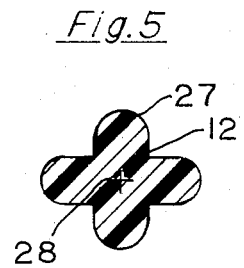
FIG. 6 shows a cross-sectional view taken along line 6—6 of FIG. 1.

Distal end 19 of implement 10 has a bulbous or mushroom-shaped protuberance extending therefrom and comprising button or dome 25 connected to end 19 by recessed shaft 26 of lesser diameter than portion 25. Dome 25 has a peripheral scraping edge 30 thereon. Handle portion 12 may be cylindrical, but in the preferred embodiment has a plurality of longitudinal strengthening ribs 27 symmetrically arranged about the center axis 28 of the handle as seen particularly from FIG. 6.

In operation, implement 10 is initially introduced onto the cervical canal with distal end 19 projecting therewithin and with oppositely directed projections 21 and 23 bearing against the outer surfaces of the squamo columnar junction. While thus positioned, implement 10 is rotated 360° about axis 28, although such rotation could obviously be more than one complete turn. During the foregoing movement, edges 16 and 18 bear uniformly throughout their length with the surfaces which they contact and which have substantially the same contours as the path defined by the edges during the stated rotation. The relationship between edges 16, 18 and grooves 20, 22 as discussed above results in a plowing and scraping action whereby edges 16, 18 detach cells, surface tissue and other diagnostic material from the test situs, such material being channeled into the mentioned grooves as it is progressively accumulated. During withdrawal of implement 10, additional cells or the like are captured by the mild scraping action of the peripheral edge 30 of protuberance 25 and retained about recessed shaft portion 26 on distal end 19 of the implement. Thereafter, force is applied through portions 12 and 14 as required to fracture completely through groove 17 and separate the two stated portions. Blade portion 14, with the collected matter in grooves 20, 22 is then dropped into a biopsy bottle which is sealed and sent to a laboratory for pathological analysis. The biopsy bottle contains a fixative composition in a colloidal gel form for preserving the normal structure of tissues as closely as possible to its condition during life. If desired, the implement 10 with the collected matter in grooves 22 may be placed into the biopsy bottle such that the groove 17 is in close proximity to the top edge of the bottle. The implement 10 may now be rotated about a vertical axis with the groove 17 resting on the upper most edge of the biopsy bottle such that the implement is fractured completely through the groove 17 into two separate portions with the blade portion dropping into the biopsy bottle.

From the foregoing, it may be seen that the structure and method in this case provide a rapid and effective means for collecting diagnostic matter and with a minimum of specialized skill. The plowing and scraping action of blade edges 16, 18 assures complete collection of matter throughout the entire test area whereby a comprehensive sampling is achieved, and further assures that such matter will include surface tissue structure rather than loose cells only. The area thus sampled is wider and of greater yield potential than could be accomplished by multiple biopsies. The tissue sheared from the test surface is shallow, so that pain or post operative bleeding are not encountered in using implement 10. Moreover, the procedure can be carried out simply during the course of a pelvic examination in a medical office and requires no elaborate medical or hospital surgery equipment.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

I claim:

1. The method of collecting tissue fragments from the squamo columnar area of a human uterus, comprising:
    contacting said area with a scraping edge of an elongated instrument adapted to remove tissue fragments therefrom,
    moving said edge relative to said area in a path corresponding to the surface contour thereof by rotating a handle on said instrument to remove tissue fragments from substantially all of said area, and
    breaking away said edge and tissue fragments from said instrument, by grasping said handle of said instrument with one hand and a portion of thd scraping edge of the instrument with the other hand and bending the blade portion in a direction transverse to the longitudinal axis of the handle until said edge and tissue fragments are broken away and
    sealing said edge and said removed fragments in a sterile container for storage, transit, handling and/or mailing.

2. The method of collecting tissue fragments as recited in claim 1 wherein said edge and tissue fragments are placed in said container before said edge and said fragments are broken away from said instrument.

* * * * *